Jan. 15, 1935.  R. L. DE LOACHE  1,987,731
ALTERNATING CURRENT RELAY APPARATUS
Filed May 27, 1933

WITNESSES:
Leon J. Jaza
Geo. O. Harrison

INVENTOR
Robert L. De Loache.
BY
ATTORNEY

Patented Jan. 15, 1935

1,987,731

UNITED STATES PATENT OFFICE 1,987,731

ALTERNATING CURRENT RELAY APPARATUS

Robert L. De Loache, Atlanta, Ga., assignor to Westinghouse Electric & Manufacturing Company, East Pittsburgh, Pa., a corporation of Pennsylvania Application May 27, 1933, Serial No. 673,241

6 Claims. (Cl. 175—294)

My invention relates to protective apparatus for alternating current transmission and distribution circuits, and particularly to protective relays for use with circuit breaker apparatus of the type in which the power for operating the circuit breaker trip mechanism is derived from the current transformer or shunt which supplies the protective relay.

In apparatus of this type, it has heretofore been the practice to provide some form of auxiliary device such as a transfer relay, tripping reactor or direct trip device as an adjunct of the protective relay, in order to avoid circulating the comparatively heavy tripping current through the contact members of the protective relay. These auxiliary devices, except the tripping reactor, in general, are provided with an operating winding and a restraining winding which normally carry the secondary current of the current transformer and produce opposing forces on the armature of the auxiliary device. Under fault conditions, the restraining winding is rendered ineffective by the protective relay, and the operating winding produces a tripping operation of the auxiliary element armature. Because of the circulation of the transformer secondary current through the windings of the auxiliary device during normal circuit conditions, a burden additional to that of the protective relay is imposed on the current transformer, and the losses in the relay apparatus are increased. For many applications, the additional burden and losses imposed by the auxiliary device are not objectionable, but in some applications, particularly where it is desired to use bushing type current transformers, the additional burden may be prohibitive. Furthermore, such auxiliary devices require additional wiring and panel space which may render their use objectionable.

It is accordingly an object of my invention to provide a novel protective relay for use with circuit breaker apparatus of the type indicated above, which shall normally impose a minimum current transformer burden.

Another object of my invention is to provide a novel protective relay for use with circuit breaker apparatus of the type indicated above, which shall not require the use of external auxiliary devices, such as transfer relays or direct trip mechanism.

Figure 1:
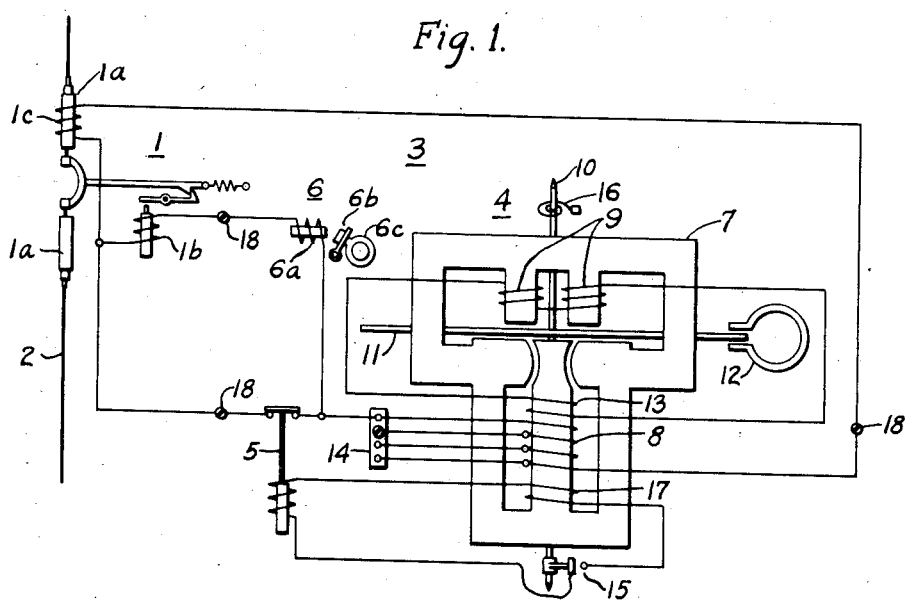
Figure 2:
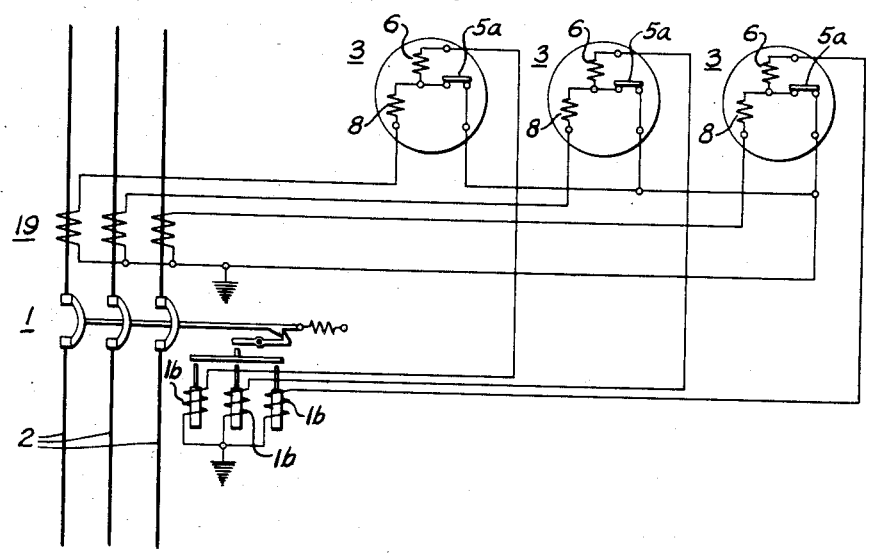

Other objects of my invention will become evident from the following detailed description taken in conjunction with the accompanying drawing, in which Figure 1 is a diagrammatic view of a protective relay and associated apparatus embodying my invention, and Fig. 2 is a diagrammatic view of an application of the relay shown in Fig. 1 to a polyphase alternating current circuit.

Referring to Fig. 1, which shows an embodiment of my invention as used with bushing type current transformer apparatus, a high voltage circuit breaker 1 is connected in a transmission circuit or high voltage feeder 2 in the usual manner to interrupt the feeder circuit under fault conditions. The circuit breaker 1 may be of any suitable type having condenser-type or oil-filled type bushings 1a for insulating the high voltage circuit breaker parts, and having a trip coil 1b. One of the bushings 1a is provided with a bushing type current transformer 1c.

A protective relay 3, constructed in accordance with my invention, is provided for controlling the trip coil 1b. The relay 3 comprises an overcurrent element 4, preferably of the low-energy induction-disc type, a normally closed auxiliary element 5 and an operation indicator 6, preferably mounted in a single case (not shown).

The overcurrent element 4 comprises a driving magnet 7 having a lower pole winding 8, and a pair of upper pole windings 9 mounted thereon in the usual manner, and a rotating assembly 10 having an induction disc 11 subject to the rotating field produced by the driving magnet 7 and to a damping field produced by a drag magnet 12. A winding 13 is provided for energizing the upper pole windings 9 to produce quadrature flux in a manner well understood in the art. The lower pole winding 8 is tapped at intermediate points and the taps are connected to a connector block 14 of the usual type. A set of normally open contact members 15 are mechanically connected to the rotating assembly 10 in any suitable manner to be operated thereby, and a biasing spring 16 is provided for normaly maintaining the contact members 15 in a circuit opening position. As the above described elements of the relay 3 are well known in the art, detailed description and illustration of their construction are for simplicity omitted.

In accordance with my invention, the coil of the auxiliary element 5 is connected in series with the contact members 15 to be energized in any suitable manner from the current transformer 1c when the contact members 15 are closed. For this purpose a separate auxiliary winding 17 is preferably mounted on the lower pole member of the driving magnet 4 and is connected to the coil of the auxiliary element 5 in series with the contact member 15. The contact members of the auxiliary element 5 are connected in a series circuit which includes the secondary winding of the current transformer 1c, the lower pole winding 8 of the relay 3 and the connector block 14. The trip coil 1b of the circuit breaker 1 is connected in parallel to contact members of the auxiliary element 5, and the coil of the operation indicator 6 is preferably included in series with the trip coil 1b. The operation indicator 6 may be of the usual manually reset type comprising an operating coil 6a and a magnetic armature 6b for moving a target or semaphore 6c into a visible position when the coil 6a is energized. The terminals of the relay 3 are indicated diagrammatically at 18.

The operation of the above described apparatus may be set forth as follows: It is assumed that initially the circuit breaker 1 and the contact members of the relay 3 are in the positions shown in Fig. 1, and that the feeder 2 is carrying current of a value less than the minimum required for operation of the relay 3 with the connector block 14 adjusted as shown. The secondary current of the current transformer 1c circulates through the lower pole winding 8, and a current is induced in the winding 13 which circulates through the upper pole windings 9, thereby providing a relay quadrature flux and a torque on the induction disc 11. As the contact members of the auxiliary element 5 short-circuit the trip coil 1a and the operating coil 6a of the operation indicator 6, no current circulates through the latter elements.

If an overcurrent condition occurs in the feeder 2, the torque acting on the induction disc 11 increases to a value higher than the biasing torque of the spring 16, and the contact members 15 close after a time delay determined by the design and adjustments of the overcurrent element 4 and the magnitude of the overcurrent condition. As the overcurrent element 4 in the illustrated embodiment of my invention, is of the low-energy type, the time element characteristics of the relay 3 are of the usual inverse with definite minimum type.

Upon closure of the contact members 15, the alternating flux in the lower pole of the driving magnet 4 induces a current in the circuit of the auxiliary winding 17 and the coil of the auxiliary element 5, and the auxiliary element 5 opens to insert the trip coil 1b and operation indicator 6a in series with the secondary winding of the current transformer 1c. The circuit breaker 1 accordingly trips open and the target 6c moves to its operated position.

In the operation described above it will be noted that during normal conditions of the feeder 2, no current flows in the auxiliary winding 17 nor in the shunt circuit which includes the trip coil 1b and the operation indicator 6. The burden imposed on the current transformer 1c is accordingly only that of the low-energy overcurrent element 4, which may be of the order of 2.5 volt amperes. As the auxiliary winding 17 is open circuited, it has no inductive effect upon the induction element 4 and the time characteristics of the latter are the same as those of a low-energy overcurrent relay of the usual type.

Referring to Fig. 2, which shows the preferred connections for a bank of relays of the type shown in Fig. 1 for use as phase relays in the protection of polyphase circuits, a polyphase feeder 2 is controlled by means of a circuit breaker 1 having three trip coils 1b, each effective when energized to trip the breaker 1. Three relays 3, in all respects similar to the corresponding relay of Fig. 1, but shown in more diagrammatic form, are connected to a bank of current transformers 19 to be energized in accordance with the phase currents of feeder 2. The secondary windings of the current transformers 19 are connected in star with neutral grounded, and each secondary winding is connected in series with the lower pole winding 8 and auxiliary element contact members 5a of the corresponding relay 3. The trip coils 1b are connected on one side to ground and on the other side in series with the operation indicator 6 of the corresponding relay to the internal junction point between the lower pole winding 8 and the contact members 5a. The operation of the apparatus shown in Fig. 2 will be obvious from that described above in connection with Fig. 1.

It will be understood that Figs. 1 and 2 are diagrammatic and that many elements and structural details such as a time lever adjustment, mounting frame, bearings and cover which would be used in a practical embodiment of the invention have for simplicity been omitted. Although I have described my invention in connection with overcurrent relays and bushing type transformers, it will be obvious that the invention is of general utility in the protective art.

I do not intend that the present invention shall be restricted to the specific structural details, arrangement of parts or circuit connections herein set forth as various modifications thereof may be effected without departing from the spirit and scope of my invention. I desire, therefore, that only such limitations shall be imposed as are indicated in the appended claims. I am aware that reactive shunts and other devices which are structurally different from current transformers are sometimes used for the same purpose as the latter, and desire that the term "current transformer" in the appended claims shall be given a sufficiently broad interpretation to include all equivalent devices.

I claim as my invention:

1. In a protective relay for use with a current transformer, a fault responsive element having an energizing winding and normally open contact members, an auxiliary element having normally closed contact members and means including a coil for operating said normally closed contact members to circuit opening position, conductors connecting said winding and said normally closed contact members in a series circuit to be energized in accordance with the secondary current of said transformer, energizing means for said coil controlled by said normally open contact members, and relay terminals connected to said series circuit on both sides of said normally closed contact members, whereby upon operation of said fault responsive element to close said normally open contact members a voltage derived from said transformer appears across said relay terminals.

2. In a protective relay for use with a current transformer, a fault responsive element having a magnetic structure and a first set of contact members, said element having an energizing winding and an auxiliary winding in inductive relationship with said magnetic structure, an auxiliary element having a second set of contact members and electromagnetic means including a coil energized by said auxiliary winding and controlled by said first set of contact members for causing said second set of contact members to be closed under normal conditions and opened in response to a fault condition, conductors connecting said energizing winding and said second set of contact members in a series circuit to be energized in accordance with the secondary current of said transformer, and relay terminals connected to said series circuit on both sides of said contact members, whereby upon operation of said fault responsive element a voltage appears across said relay terminals.

3. In an overcurrent relay for use with a current transformer, an induction type overcurrent element having a driving magnet and normally open contact members, said overcurrent element having an energizing winding and an auxiliary winding in inductive relationship with said driving magnet, an auxiliary element having normally closed contact members and means including a coil for operating said normally closed contact members to circuit opening position, conductors connecting said energizing winding and said normally closed contact members in a series circuit to be energized in accordance with the secondary current of said transformer, conductors connecting said coil and said auxiliary winding in a circuit including said normally open contact members, and relay terminals connected to said series circuit on both sides of said normally closed contact members, whereby commutation of said series circuit by said normally open contact members is avoided and upon operation of said overcurrent element a voltage derived from said transformer appears across said relay terminals.

4. In protective apparatus for an alternating current circuit, a circuit breaker having a trip coil, a current transformer energized in accordance with the current in said circuit, said transformer having a secondary winding, a fault responsive relay element having an energizing winding and normally open contact members, an auxiliary relay element having normally closed contact members and means including a coil for operating said normally closed contact members to circuit opening position, conductors connecting said secondary winding, said energizing winding and said normally closed contact members in a series circuit, energizing means for said coil controlled by said normally open contact members and conductors connecting said trip coil in a circuit in parallel to said normally closed contact members, whereby upon operation of said fault responsive element the secondary current of said transformer is circulated through said trip coil to cause said circuit breaker to open.

5. In protective apparatus for an alternating current circuit, a circuit breaker having a trip coil, a current transformer energized in accordance with the current in said circuit, said transformer having a secondary winding, an induction type overcurrent element having a driving magnet and normally open contact members, said overcurrent element having an energizing winding and an auxiliary winding in inductive relationship with said driving magnet, an auxiliary relay element having normally closed contact members and means including a coil for operating said normally closed contact members to circuit opening position, conductors connecting said secondary winding, said energizing winding and said normally open contact members in a series circuit, conductors connecting said coil and said auxiliary winding in a circuit including said normally open contact members and conductors connecting said trip coil in a circuit in parallel to said normally closed contact members, whereby upon operation of said overcurrent element the secondary current of said transformer is circulated through said trip coil to cause said circuit breaker to open.

6. In protective apparatus for an alternating current circuit, a circuit breaker having a trip coil, a current transformer energized in accordance with the current in said circuit, said transformer having a secondary winding, a fault responsive relay element having an energizing winding and normally open contact members, an auxiliary relay element having normally closed contact members and means including a coil for operating said normally closed contact members to circuit opening position, conductors connecting said secondary winding, said energizing winding and said normally closed contact members in a series circuit, energizing means for said coil controlled by said normally open contact members, an operation indicator having an operating coil, and conductors connecting said trip coil and said operating coil in a circuit in parallel to said normally closed contact members, whereby upon operation of said overcurrent element the secondary current of said transformer is circulated through said trip coil and said operating coil, to cause a tripping operation of said circuit breaker and an operation of said operation indicator.

ROBERT L. DE LOACHE.